(12) United States Patent
He et al.

(10) Patent No.: US 10,387,424 B2
(45) Date of Patent: Aug. 20, 2019

(54) EFFICIENCY FOR REAL-TIME DATA PROCESSING

(71) Applicant: International Business Machines Corporation, Armonk, NY (US)

(72) Inventors: Lei He, Beijing (CN); Yang Liu, Shanghai (CN); Cheng Luo, Beijing (CN); Shaw-Ben Shi, Austin, TX (US); Meng Hong Tsai, Shanghai (CN); Xi Ning Wang, Beijing (CN); Shun Xiang Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 789 days.

(21) Appl. No.: 14/940,228

(22) Filed: Nov. 13, 2015

(65) Prior Publication Data

US 2017/0140001 A1    May 18, 2017

(51) Int. Cl.
*G06F 16/00* (2019.01)
*G06F 16/2455* (2019.01)
*H04L 29/06* (2006.01)
*G06F 16/2458* (2019.01)
*G06F 16/9535* (2019.01)
*H04L 29/08* (2006.01)

(52) U.S. Cl.
CPC .... *G06F 16/24568* (2019.01); *G06F 16/2477* (2019.01); *G06F 16/9535* (2019.01); *H04L 65/60* (2013.01); *H04L 65/602* (2013.01); *H04L 67/12* (2013.01)

(58) Field of Classification Search
None
See application file for complete search history.

(56) References Cited

U.S. PATENT DOCUMENTS 8,880,524 B2    11/2014  Pandey et al.
2013/0046725 A1  2/2013  Cammert et al.
(Continued)

OTHER PUBLICATIONS

DAS, Tathagata, "Improved Fault-tolerance and Zero Data Loss in Spark Streaming", Jan. 15, 2015, Databricks, 7 pages, © Databricks 2015, <https://databricks.com/blog/2015/01/15/improved-driver-fault-tolerance-and-zero-data-loss-in-spark-streaming.html>.
(Continued)

*Primary Examiner* — Paul Kim
(74) *Attorney, Agent, or Firm* — Aaron N. Pontikos

(57) ABSTRACT

A computer-implemented method includes receiving a data stream and dividing the data stream into one or more data artefacts for one or more time intervals. The computer-implemented method further includes generating one or more contexts. Each of the one or more contexts are for at least one of the one or more time intervals. The computer-implemented method further includes storing each of the one or more data artefacts in shared storage. The shared storage is accessible for each of the one or more contexts. The computer-implemented method further includes, for each context of the one or more contexts: determining a dependency for the context; monitoring the context for a completion of said dependency; and responsive to the completion, releasing the dependency. The computer-implemented further includes removing those of the one or more data artefacts that do not belong to the dependency for any of the one or more contexts.

14 Claims, 4 Drawing Sheets

(56) References Cited

U.S. PATENT DOCUMENTS

| | | | |
|---|---|---|---|
| 2013/0339473 A1 | 12/2013 | McCaffrey et al. | |
| 2014/0040237 A1 | 2/2014 | Chen et al. | |
| 2014/0156806 A1* | 6/2014 | Karpistsenko | G06F 17/30557 709/219 |
| 2014/0280766 A1 | 9/2014 | Banerjee et al. | |
| 2014/0324751 A1 | 10/2014 | Roberts et al. | |

OTHER PUBLICATIONS

Montalenti, Andrew, "streamparse: real-time streams with Python and Apache Storm", PyCon 2015 Montreal, 10 pages, printed on Sep. 2, 2015, <https://us.pycon.org/2015/schedule/presentation/359/>.

Ng, Tony, "pulsarIO/realtime-analytics", GitHub, printed on Sep. 2, 2015, 5 pages, © 2015 GitHub, Inc., <https://github.com/pulsarIO/realtime-analytics/wiki>.

He et al., "Efficiency for Real-Time Data Processing", U.S. Appl. No. 15/616,326, filed Jun. 7, 2017.

List of IBM Patents or Patent Applications Treated as Related. Filed Jun. 7, 2017. 2 pages.

\* cited by examiner

EFFICIENCY FOR REAL-TIME DATA PROCESSING

BACKGROUND

The present invention relates generally to networks of embedded devices and in particular to real-time data processing of data streams transmitted by networks of embedded devices.

The Internet of Things ("IoT") is the network of physical objects or "things" embedded with electronics, software, sensors, and network connectivity, which enables these objects to collect and exchange data. The IoT allows objects to be sensed and controlled remotely across existing network infrastructure, creating opportunities for more direct integration between the physical world and computer-based systems, and resulting in improved efficiency, accuracy and economic benefit. Here, each "thing" is uniquely identifiable through its embedded computing system, but is also able to interoperate within the existing Internet infrastructure. These devices collect useful data and then autonomously flow the data between other devices. However, as the number of "things" continue to increase, it has become further time consuming to load the data in real-time data processing, especially when having to access external file storage or databases frequently. Thus, the increase in the number of "things" has resulted in a decrease in the efficiency of real-time data processing.

SUMMARY

A computer-implemented method includes receiving a data stream. The computer-implemented method further includes dividing the data stream into one or more data artefacts. Each of the one or more data artefacts are for one or more time intervals. The computer-implemented method further includes generating one or more contexts. Each of the one or more contexts are for at least one of the one or more time intervals. The computer-implemented method further includes storing each of the one or more data artefacts in a shared storage. The shared storage is accessible for each of the one or more contexts. The computer-implemented method further includes, for each context of the one or more contexts: Determining a dependency for the context. The dependency includes those of the one or more data artefacts that are for those of the one or more time intervals that the context is for. The computer-implemented method further includes, for each context of the one or more contexts: monitoring the context for a completion of said dependency. The computer-implemented method further includes, for each context of the one or more contexts, responsive to the completion, releasing the dependency. The computer-implemented further includes removing those of the one or more data artefacts that do not belong to the dependency for any of the one or more contexts.

DETAILED DESCRIPTION

Figure 1:
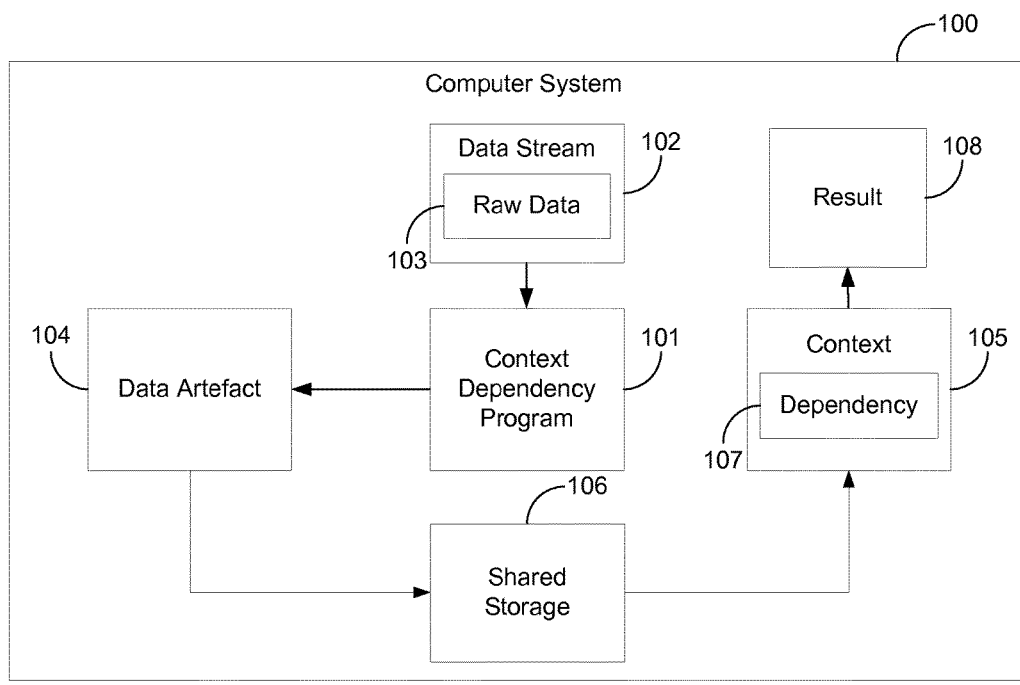
FIG. 1 is a block diagram of one embodiment of a computer system environment 100 suitable for operation in accordance with at least one embodiment of the invention.

Referring now to various embodiments of the invention in more detail, FIG. 1 is a block diagram of one embodiment of a computer system environment suitable for operation in accordance with at least one embodiment of the invention. Within a computer system 100, a context dependency program 101 may receive a data stream 102. The data stream 102 may include raw data 103 from a network of physical objects or "things" embedded with electronics, software, and sensors, generically "embedded devices." More specifically, "things" can refer to a wide variety of devices such as heart monitoring implants, biochip transponders on farm animals, electric clams in coastal water, automobiles with built-in sensors, or transformers in the energy industry. The context dependency program 101 may further divide the data stream 102 into one or more data artefacts 104 that include processed data. Each of the one or more data artefacts 104 are for one or more time intervals.

The context dependency program 101 may further generate one or more contexts 105. Each of the one or more contexts 105 are for at least one of the one or more time intervals. Context may be understood as any information that can characterize the situation of an entity. An entity may be a person, place or object that is considered relevant to the interaction between a user and an application, including the user and applications themselves, and by extension, the environment the user and applications are embedded in (though, it should be understood that the context is not intended to include users, people, or other naturally occurring phenomena, in themselves). Examples of contexts include location, time, proximity, user status, device status and network capabilities.

The context dependency program 101 may further store each of the one or more data artefacts 104 in a shared storage 106. The shared storage 106 may be accessible for each of the one or more contexts 105. The context dependency program 101 may further, for each context 105 of the one or more contexts 105, determine a dependency 107 for the context 105. The dependency 107 includes those of the one or more data artefacts 104 that are for those of the one or more time intervals that the context 105 is for. More specifically, one or more data artefacts 104 may be used for a context 105 for multiple time intervals.

The context dependency program 101 may further, for each context 105 of the one or more contexts 105, monitor the context 105 for a completion of the dependency 107. Completion of the dependency 107 may exist when a result 108 is yielded from analysis of the one or more data artefacts 104 for a context 105 for a given time interval. Here, the result 108 may be the transformation of the one or more data artefacts 104 into knowledge or high-level information.

For example, knowledge or high-level information may be valuable in a health monitoring application, such as a hypertension detection device. In this example, the context 105 would be hypertension and the data artefacts 104 may include systolic blood pressure ("SBP"), diastolic blood pressure ("DBP"), and heart rate ("HR"). More specifically, for a given sex, weight, and age, the context 105 for hypertension may be average SBP over 5 minutes: >130 mm Hg), average DBP over 5 minutes: >95 mm Hg, and average HR over 5 minutes: >90 bpm. Furthermore, there may be a data artefact 104 for "SBP," "DBP," and "HR," respectively.

In order to determine if hypertension exists, the context dependency program 101 may store the "SBP," "DBP," and "HR" data artefacts 104 in a shared storage 106 for the time interval 0 to 5 minutes. The context dependency 101 may monitor the context 105 for completion of analysis of the "SBP" data artefact 104, "DBP" data artefact 104, and "HR" data artefact 104. Completion of the context 105 may exist when a result 108 is yielded from the analysis of the dependency 107. Thus, a result of an average of ("SBP:" 142 mm Hg, "DBP:" 97 mm Hg, "HR:" 112 bpm) over the time interval 0 to 5 minutes may indicate that hypertension is occurring.

The context dependency program 101 may further, for each context 105 of the one or more contexts 105, responsive to the completion, release the dependency 107. The context dependency program 101 may further remove those of the one or more data artefacts 104 that do not belong to the dependency 107 for any of the one or more contexts 105. Here, once the dependency 107 is released, the context dependency program 101 has determined that one or more data artefacts 104 stored in the shared storage 106 are no longer needed for analysis by the one or more contexts 105 for subsequent time intervals. In order to increase the efficiency of the real-time data processing for the remaining one or more contexts 105, the one or more data artefacts 104 that are no longer dependent by the one or more contexts 105 may be removed from the shared storage 106 by the context dependency program 101.

Figure 2:
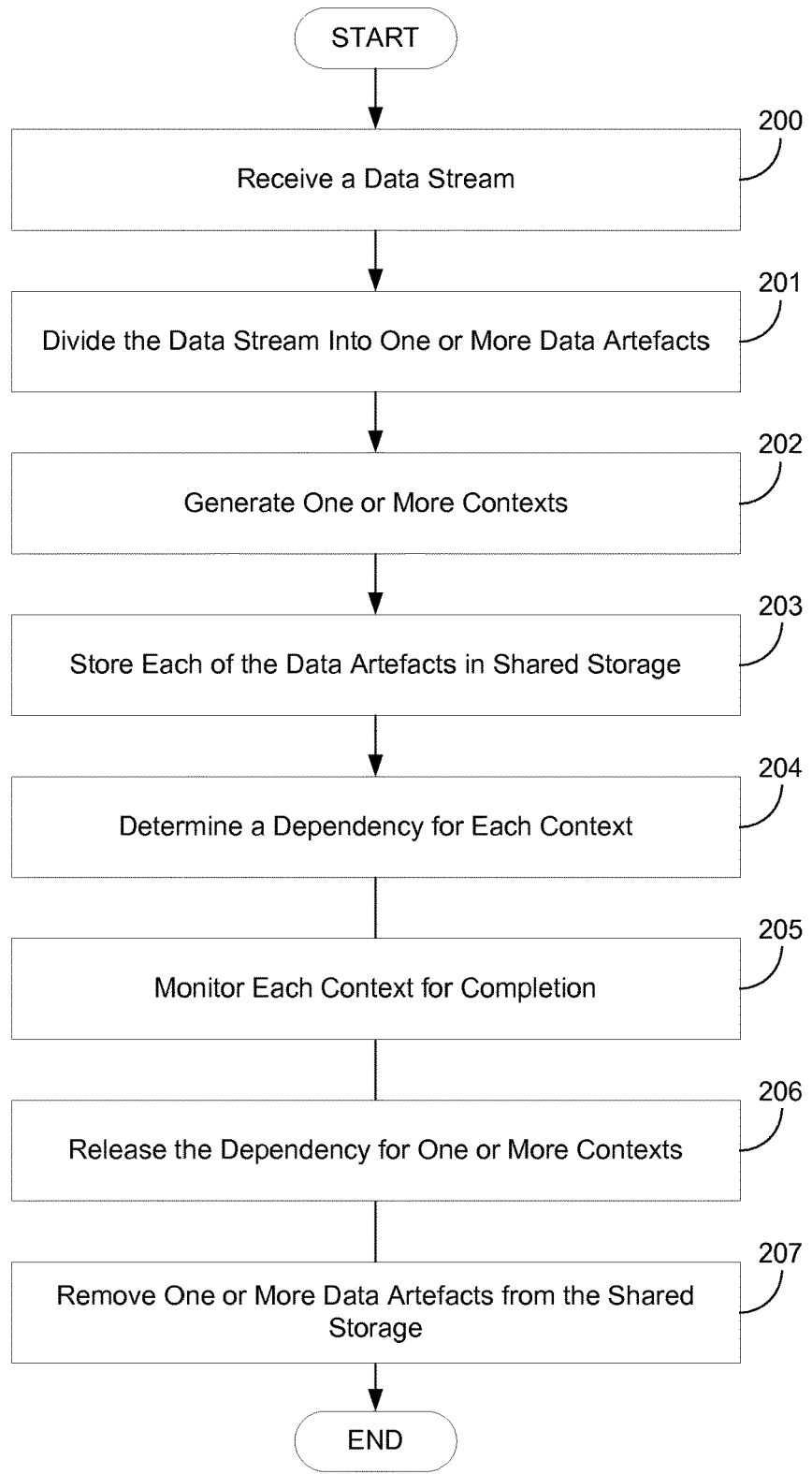
FIG. 2 is a flow chart diagram depicting the context dependency program in accordance with at least one embodiment of the invention.

FIG. 2 is a flow chart diagram depicting the context dependency program in accordance with at least one embodiment of the invention. According to the depicted embodiment, at step 200, the context dependency program 101 may receive a data stream 102. The data stream 102 may include raw data 103 from one or more embedded devices. The context dependency program 101 may receive a data stream 102 from one or more remotely located embedded devices by any generally known messaging protocols, including, but not limited to MQTT, Advanced Messaging Queuing Protocol, IETF Constrained Application Protocol, and XMPP.

For example, the data stream 102 may be generated by a wireless sensor network (WSN) located within an electrical transformer. A WSN includes spatially distributed autonomous sensors which monitor physical or environmental conditions, such as temperature, sound, and pressure. The WSN is built of "nodes," where each node is connected to one or more sensors. Typically, each sensor network node has several parts, including a radio transceiver with an internal antenna or connection to an external antenna, a microcontroller, an electronic circuit for interfacing with the sensors, and an energy source (e.g. a battery or embedded form of energy harvesting). In many applications, a WSN may communicate with a Local Area Network (LAN) or Wide Area Network (WAN) through a gateway, which acts as a bridge between the WSN and another network. More specifically, the context dependency program 101 may exist in a cloud-based, virtual, or distributed environment or a remote environment on defined server hardware, or, more generally, the context dependency program 101 may exist in any type of environment suitable for data streaming.

At step 201, the context dependency program 101 may divide the data stream 102 into one or more data artefacts 104. The one or more data artefacts 104 may include processed data. Previously, at step 200, the context dependency program 101 may receive raw data 103 lacking any organization or order. Since streaming data is an analytic computing platform that is focused on speed, applications such as the context dependency program 101 require a continuous stream of often unstructured data to be processed. However, at step 201, the context dependency program may 101 may clean or process the unstructured raw data 103 into structured data in the form of one or more data artefacts 104. Here, each of the one or more data artefacts 104 may include data transmitted by an individual sensor in a device, a group of sensors in a network of devices, or more generally by one or more devices by any known transmission methods. The data artefacts may be formed based on a predetermined data storage capacity or a delineated time period. Furthermore, each of the one or more data artefacts 104 may be utilized for at least one or more time intervals.

At step 202, the context dependency program 101 may generate one or more contexts 105. Each of the one or more contexts 105 may be utilized for at least one of the one or more time intervals. Context may be defined as any information that can be used to characterize the situation of an entity, such as a person, place or object. In one scenario, the context dependency program 101 may generate one or more contexts 105 for an electrical transformer to determine an "average value of load." Here, the context dependency program 101 may generate a context for "average value of load" for one or more 5 minute time intervals. For example, the context dependency program 101 may generate a context 105 for "average value of load" for time 0 to 5 minutes. The context dependency program 101 may further generate a context 105 for "average value of load" for time 5 to 10 minutes. The context dependency program 101 may further generate a context 105 for "average value of load" for time 10 to 15 minutes.

At step 203, the context dependency program 101 may store each of the one or more data artefacts 104 in a shared storage 106. The shared storage 106 may be accessed by a single or multiple processors. The shared storage 106 may be in the form of distributed shared memory, where a distributed memory system consists of multiple independent processing nodes with local memory modules connected by a general interconnection network. More specifically, the shared storage 106 may be a cloud-based, virtual, or distributed environment or a remote environment on defined server hardware.

At step 204, for each context 105 of the one or more contexts 105, the context dependency program 101 may determine a dependency 107 for the context 105. More specifically, the dependency 107 may include those of the one or more data artefacts 104 that are for those of the one or more time intervals that the context 105 is for. At step 205, for each context 105 of the one or more contexts 105, the context dependency program 101 may monitor the context 105 for a completion of the dependency 107. In some embodiments, analysis of the dependency 107 may be performed by a general purpose analytics engine. In other embodiments, analysis of the dependency 107 may be performed by an analytics engine that operates on a model tailored to analyzing contexts, such as IBM® Watson®. Completion of the dependency 107 may exist when a result 108 is yielded from analysis of the one or more data artefacts 104 for a context 105 for a given time interval. Here, the result 108 may be the transformation of the one or more data artefacts 104 into knowledge or high-level information.

High-level information may be recognized as an understanding and ability to make use of raw data 103 to answer questions, solve problems, and make decisions. For example, payroll data may be coupled with other cost data, sales data, and consumer data to produce information about which products are most profitable. This collection of raw data may then be processed into reports that facilitate management decisions. In another example, high-level information may be the collection of raw sensor data which then may be processed to determine whether the average value of load for a transformer exceeds 2,000 KVA (kilovolt-ampere, a unit of apparent power) within a 5 minute time interval.

Upon completion of analysis of the dependency 107, the context dependency program 101 may execute a real-time action trigger based on the result 108 yielded from analyzing the one or more data artefacts 104 for a context 105. For example, a real-time action trigger may be a pre-built action, such as displaying text (e.g. a push-up notification or SMS message) to a device, such as a desktop computer or mobile device. In another example, a real-time action trigger may be real-time integration of the result 108 within the device for which the analysis was performed for (e.g. a transformer in the energy industry). In yet another example, a real-time action trigger may be real-time visualization of the result 108.

At step 206, for each context 105 of the one or more contexts 105, the context dependency program 101 may release the dependency 107. The context dependency program 101 may release the dependency 107 when a data artefact 104 is no longer needed to be analyzed for a context 105 for one or more time intervals. At step 207, the context dependency program 101 may remove those of the one or more data artefacts 104 that do not belong to the dependency 107 for any of the one or more contexts 105. Here, the one or more data artefacts 104 may be removed by erasing or deleting memory from the shared storage 106.

Figure 3:
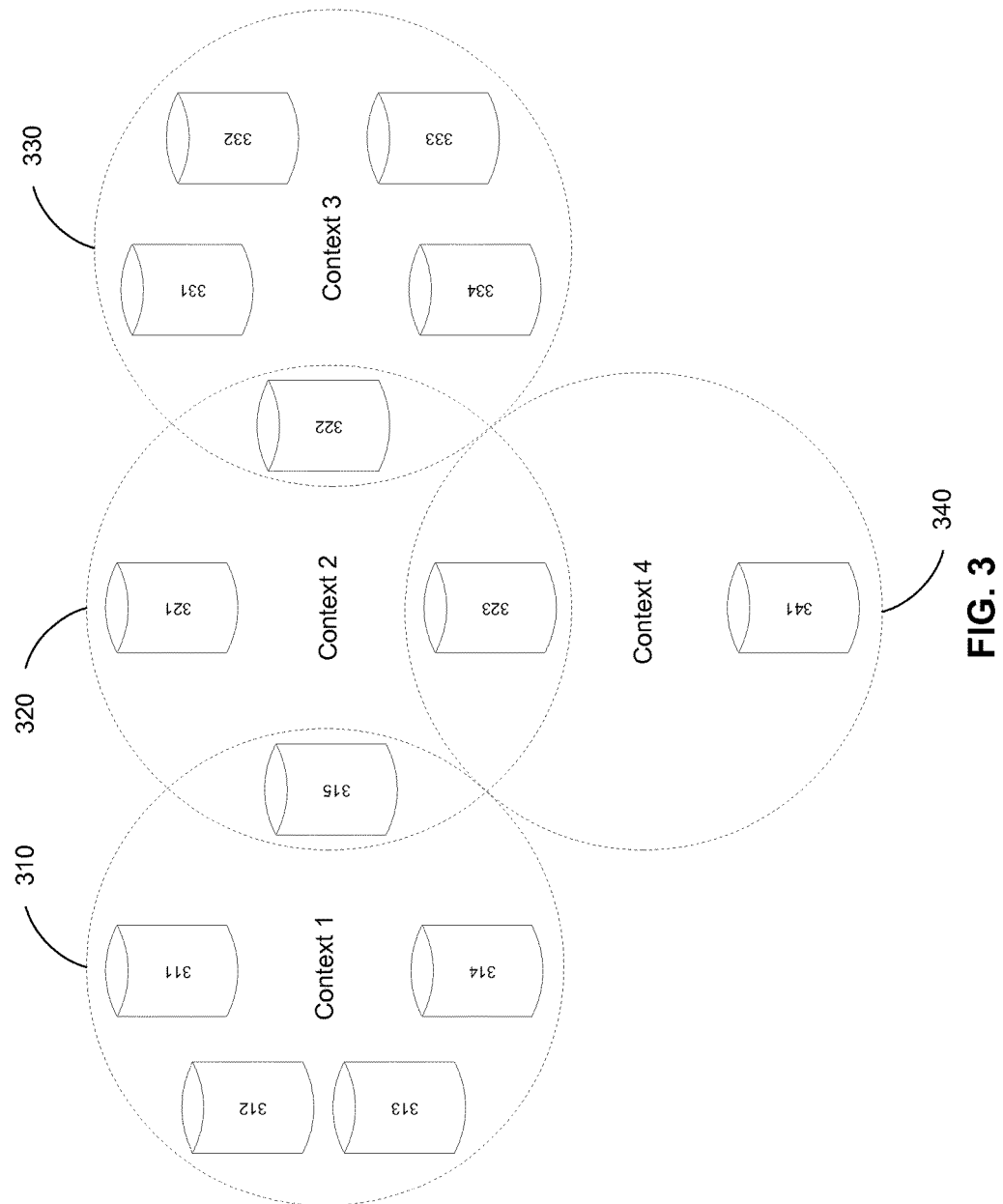
FIG. 3 is a flow chart diagram for a portion of a worked example of operational steps in accordance with at least one embodiment of the invention.

FIG. 3 is a flow chart diagram for a portion of a worked example of operational steps in accordance with at least one embodiment of the invention. In FIG. 3, the dependency 107 of one or more data artefacts 104 for those of the one or more time intervals that the context 105 is for can be seen. For example, each cylinder may represent a data artefact 104 consisting of data transmitted from sensors located throughout an electrical transformer. Furthermore, each context 310,320,330, and 340 may be for a given time interval.

In this example, the first context 310 may be "the average value of load exceeds 2,200 KVA" for time interval 0 to 5 minutes, the second context 320 may be "the average value of load exceeds 2,000 KVA" for time interval 5 to 10 minutes, the third context 330 may be "the average value of load exceeds 1,800 KVA" for time interval 10 minutes to 15 minutes, the fourth context 340 may be "the average value of load exceeds 1,700 KVA" for time interval 15 to 20 minutes.

For the first context 310, the context dependency program 101 may determine a dependency 107 for the context 310 consisting of the data artefacts 311-315. The context dependency program 101 may further monitor the first context 310 for completion of analysis of the data artefacts 311-315. Here, completion of the first context 310 may yield a result 108 in the form of an average value of load of 2,150 KVA for time interval 0 to 5 minutes. Since data artefacts 311-314 are only dependent for the first context 310, the context dependency program 101 may release the dependency 107 of data artefacts 311-314 for the first context 310 upon completion of analyzing the first context 310. The context dependency program 101 may further remove the data artefacts 311-314 from the shared storage 106. However, since the second context 320 is dependent on the data artefact 315, the context dependency program 101 may not release the dependency 107 of data artefact 315.

For the second context 320, the context dependency program 101 may determine a dependency 107 for the context 320 consisting of data artefacts 315 and 321-323. The context dependency program 101 may further monitor the second context 320 for completion of analysis of data artefacts 315 and 321-323. Here, completion of the second context 320 may yield a result 108 in the form of an average value of load of 2,050 KVA for time interval 5 to 10 minutes. Since the data artefact 321 is only dependent for the second context 320, the context dependency program 101 may release the dependency 107 of the data artefact 321 for the second context 320 upon completion of analyzing the second context 320. The context dependency program 101 may further remove the data artefacts 321 from the shared storage 106.

However, since the third context 330 is dependent on the data artefact 322 and the fourth context 340 is dependent on the data artefact 323, the context dependency program 101 may not release the dependency 107 of the data artefact 322 for the third context 330 and the dependency 107 of the data artefact 323 for the fourth context 340. Thus, only upon completion of analysis of the data artefacts 322 and 331-334 for the third context 330 for time interval 10 to 15 minutes may the dependency 107 of data artefact 322 be released and subsequently removed from the shared storage 106. Likewise, only upon completion of analysis of the data artefacts 323 and 341 for the fourth context 340 for time interval 15 to 20 minutes may the dependency 107 of the data artefact 323 be released and subsequently removed from the shared storage 106.

Figure 4:
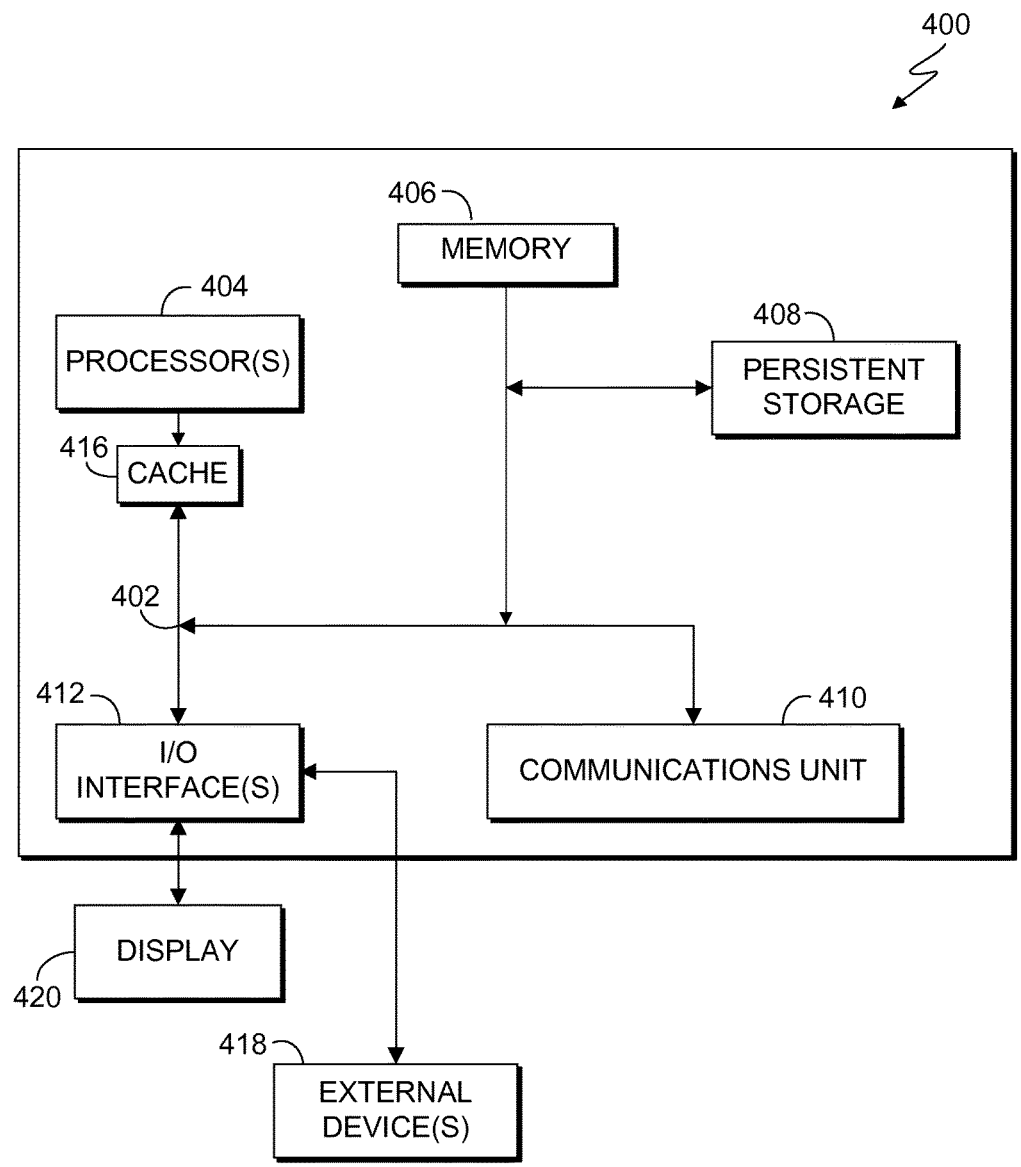
FIG. 4 is a block diagram of a computing apparatus 400 suitable for executing the context dependency program in accordance with at least one embodiment of the invention.

FIG. 4 is a block diagram depicting components of a computer 400 suitable for executing the context dependency program 101. FIG. 4 displays the computer 400, the one or more processor(s) 404 (including one or more computer processors), the communications fabric 402, the memory 406, the RAM 416, the cache 418, the persistent storage 408, the communications unit 412, the I/O interfaces 414, the display 422, and the external devices 420. It should be appreciated that FIG. 4 provides only an illustration of one embodiment and does not imply any limitations with regard to the environments in which different embodiments may be implemented. Many modifications to the depicted environment may be made.

As depicted, the computer 400 operates over a communications fabric 402, which provides communications between the computer processor(s) 404, memory 406, persistent storage 408, communications unit 412, and input/output (I/O) interface(s) 414. The communications fabric 402 may be implemented with any architecture suitable for passing data or control information between the processors 404 (e.g. microprocessors, communications processors, and network processors), the memory 406, the external devices 420, and any other hardware components within a system. For example, the communications fabric 402 may be implemented with one or more buses.

The memory 406 and persistent storage 408 are computer readable storage media. In the depicted embodiment, the memory 406 comprises a random access memory (RAM) 416 and a cache 418. In general, the memory 406 may comprise any suitable volatile or non-volatile one or more computer readable storage media.

Program instructions for the context dependency program 101 may be stored in the persistent storage 408, or more generally, any computer readable storage media, for execution by one or more of the respective computer processors 404 via one or more memories of the memory 406. The persistent storage 408 may be a magnetic hard disk drive, a solid state disk drive, a semiconductor storage device, read-only memory (ROM), electronically erasable programmable read-only memory (EEPROM), flash memory, or any other computer readable storage media that is capable of storing program instructions or digital information.

The media used by the persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of the persistent storage 408.

The communications unit 412, in these examples, provides for communications with other data processing systems or devices. In these examples, the communications unit 412 may comprise one or more network interface cards. The communications unit 412 may provide communications through the use of either or both physical and wireless communications links. In the context of some embodiments of the present invention, the source of the source of the various input data may be physically remote to the computer 400 such that the input data may be received and the output similarly transmitted via the communications unit 412.

The I/O interface(s) 414 allow for input and output of data with other devices that may operate in conjunction with the computer 400. For example, the I/O interface 414 may provide a connection to the external devices 420, which may be as a keyboard, keypad, a touch screen, or other suitable input devices. External devices 420 may also include portable computer readable storage media, for example thumb drives, portable optical or magnetic disks, and memory cards. Software and data used to practice embodiments of the present invention may be stored on such portable computer readable storage media and may be loaded onto the persistent storage 408 via the I/O interface(s) 414. The I/O interface(s) 414 may similarly connect to a display 422. The display 422 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for real-time data processing, the computer program product comprising one or more computer readable storage media and program instructions stored on said one or more computer readable storage media, said program instructions comprising instructions to:
   process, in real-time, a data stream of unstructured data received from a wireless sensor network of a computing device into a plurality of data artifacts based, at least in part, on (i) one or more predetermined time intervals and (ii) a predetermined data storage capacity;
   generate a plurality of contexts for said computing device, wherein each context included in said plurality of contexts corresponds to an average value for a predetermined time interval exceeding a predetermined threshold level for a state of said computing device;
   store said plurality of data artifacts in a distributed shared storage, wherein said distributed shared storage is accessible for each context included in said plurality of contexts;
   determine a first dependency for a first context included in said plurality of contexts, wherein said first dependency comprises a first set of data artifacts stored in said distributed shared storage for determining whether a first average value for a first predetermined time interval exceeds a first predetermined threshold level for a first state of said computing device;
   process said first set of data artifacts stored in said distributed shared storage to generate said first average value for said first predetermined time interval for said first state of said computing device;
   determine a second dependency for a second context in said plurality of contexts, wherein said second dependency comprises at least a first portion of said first set of data artifacts stored in said distributed shared storage for determining whether a second average value for a second predetermined time interval exceeds a second predetermined threshold level for a second state of said computing device; and
   remove a second portion of data artifacts included in said first set of data artifacts from said distributed shared storage that are not associated with said second dependency for said second context.

2. The computer program product of claim 1, wherein said data stream comprises raw data from one or more embedded devices.

3. The computer program product of claim 1, wherein said plurality of data artifacts comprise processed data.

4. The computer program product of claim 1, wherein said instructions to process said first set of data artifact stored in said distributed shared storage to generate said first average value for said first predetermined time interval for said first state of said computing device further comprises instructions to execute a real-time action trigger.

5. A computer system for real-time data processing, the computer system comprising:
   one or more computer processors;
   one or more computer readable storage media;
   computer program instructions;
   said computer program instructions being stored on said one or more computer readable storage media;
   said computer program instructions comprising instructions to:
   process, in real-time, a data stream of unstructured data received from a wireless sensor network of a computing device into a plurality of data artifacts based, at least in part, on (i) one or more predetermined time intervals and (ii) a predetermined data storage capacity;
   generate a plurality of contexts for said computing device, wherein each context included in said plurality of contexts corresponds to an average value for a predetermined time interval exceeding a predetermined threshold level for a state of said computing device;
   store said plurality of data artifacts in a distributed shared storage, wherein said distributed shared storage is accessible for each context included in said plurality of contexts;
   determine a first dependency for a first context included in said plurality of contexts, wherein said first dependency comprises a first set of data artifacts stored in said distributed shared storage for determining whether a first average value for a first predetermined time interval exceeds a first predetermined threshold level for a first state of said computing device;
   processing said first set of data artifacts stored in said distributed shared storage to said first average value for said first predetermined time interval for said first state of said computing device;

determine a second dependency for a second context in said plurality of contexts, wherein said second dependency comprises at least a first portion of said first set of data artifacts stored in said distributed shared storage for determining whether a second average value for a second predetermined time interval exceeds a second predetermined threshold level for a second state of said computing device; and remove a second portion of data artifacts included in said first set of data artifacts from said distributed shared storage that are not associated with said second dependency for said second context.

6. The computer system of claim 5, wherein said data stream comprises raw data from one or more embedded devices.

7. The computer system of claim 5, wherein said plurality of data artifacts comprise processed data.

8. The computer system of claim 5, wherein said instructions to process said first set of data artifact stored in said distributed shared storage to generate said first average value for said first predetermined time interval for said first state of said computing device further comprises instructions to execute a real-time action trigger.

9. The computer program product of claim 4, wherein said instructions to execute said real-time action trigger includes instructions to generate a push notification.

10. The computer program product of claim 4, wherein said instructions to execute said real-time action trigger includes instructions to integrate said first average value with said computing device.

11. The computer program product of claim 4, wherein said instructions to execute said real-time action trigger includes instructions to generate a real-time visualization of said first average value.

12. The computer system of claim 8, wherein said instructions to execute said real-time action trigger includes instructions to generate a push notification.

13. The computer system of claim 8, wherein said instructions to execute said real-time action trigger includes instructions to integrate said first average value with said computing device.

14. The computer system of claim 8, wherein said instructions to execute said real-time action trigger includes instructions to generate a real-time visualization of said first average value.

* * * * *